United States Patent
Kogure

(10) Patent No.: US 10,528,335 B2
(45) Date of Patent: Jan. 7, 2020

(54) IMAGE FORMING APPARATUS CAPABLE OF EXECUTING EXTENSION APPLICATION, METHOD OF CONTROLLING SAME, AND STORAGE MEDIUM

(71) Applicant: CANON KABUSHIKI KAISHA, Tokyo (JP)

(72) Inventor: Takeshi Kogure, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/983,165

(22) Filed: May 18, 2018

(65) Prior Publication Data

US 2018/0349122 A1    Dec. 6, 2018

(30) Foreign Application Priority Data

May 31, 2017    (JP) .................................. 2017-108036

(51) Int. Cl.
| | |
|---|---|
| G06F 8/61 | (2018.01) |
| H04N 1/32 | (2006.01) |
| H04N 1/00 | (2006.01) |
| G06F 11/36 | (2006.01) |
| G06F 8/41 | (2018.01) |
| G06F 8/65 | (2018.01) |
| G06F 9/455 | (2018.01) |

(52) U.S. Cl.
CPC .................. *G06F 8/61* (2013.01); *G06F 8/41* (2013.01); *G06F 8/65* (2013.01); *G06F 9/45516* (2013.01); *G06F 11/36* (2013.01); *H04N 1/00938* (2013.01); *H04N 1/32561* (2013.01); *H04N 2201/0094* (2013.01)

(58) Field of Classification Search
CPC .. G06F 8/61; H04N 1/00938; H04N 1/32561; H04N 2201/0094
See application file for complete search history.

(56) References Cited

U.S. PATENT DOCUMENTS

| | | | | |
|---|---|---|---|---|
| 6,092,147 | A * | 7/2000 | Levy ................... | G06F 9/44589 711/6 |
| 2008/0127088 | A1* | 5/2008 | Harmsen ................. | G06F 8/60 717/121 |
| 2011/0061048 | A1* | 3/2011 | Katoh ....................... | G06F 8/61 717/177 |
| 2013/0074048 | A1 | 3/2013 | Osawa et al. | |

(Continued)

FOREIGN PATENT DOCUMENTS

JP    2013069077 A    4/2013

*Primary Examiner* — Wei Y Zhen
*Assistant Examiner* — Amir Soltanzadeh
(74) *Attorney, Agent, or Firm* — Rossi, Kimms & McDowell LLP

(57) ABSTRACT

An image forming apparatus capable of preventing compatibility with an extension application from being impaired. The image forming apparatus installs an operation program of an extension application therein, and includes a VM (Virtual Machine) that executes a bytecoded program generated based on the operation program. The bytecoded program is generated by converting the operation program to bytecode. The operation program and the bytecoded program are written into a package, and the package is stored in a storage of the image forming apparatus.

9 Claims, 13 Drawing Sheets

(56) References Cited

U.S. PATENT DOCUMENTS

2014/0149978 A1* 5/2014 Subramanya ....... G06F 9/45512
  718/1
2016/0357546 A1* 12/2016 Chang ...................... G06F 8/65
2017/0024230 A1* 1/2017 Li ............................. G06F 8/41

* cited by examiner

IMAGE FORMING APPARATUS CAPABLE OF EXECUTING EXTENSION APPLICATION, METHOD OF CONTROLLING SAME, AND STORAGE MEDIUM

BACKGROUND OF THE INVENTION

Field of the Invention

The present invention relates to an image forming apparatus, a method of controlling the same, and a storage medium, and more particularly to an image forming apparatus that is capable of extending its function by executing an extension application, a method of controlling the same, and a storage medium.

Description of the Related Art

There has been known an MFP as an image forming apparatus that extends its function by having installed thereon a script as an operation program of an extension application. The MFP is provided with an execution environment in which a virtual machine (VM) operates to execute the operation program of the extension application. The MFP converts the installed script to bytecode to thereby generate a bytecoded script which can be interpreted by the VM. When the MFP receives an instruction for starting the extension application, the VM executes the generated bytecoded script, whereby the extension application is started (see e.g. Japanese Laid-Open Patent Publication (Kokai) No. 2013-69077).

Incidentally, the MFP requires a certain time period to complete conversion of a script to bytecode, and hence when a script is installed, the script is converted to bytecode, and the MFP stores the generated bytecoded script. With this, when the MFP receives an instruction for starting the extension application, it is possible to quickly start the extension application by executing the bytecoded script stored in the MFP.

However, in the conventional MFP, if the execution environment is updated to an execution environment which is not compatible with the bytecoded script stored in the MFP, the VM cannot execute the stored bytecoded script, and it is impossible to start the extension application. That is, the conventional MFP has a problem that compatibility with the extension application is impaired.

SUMMARY OF THE INVENTION

The present invention provides an image forming apparatus that is capable of preventing compatibility with an extension application from being impaired, a method of controlling the same, and a storage medium.

In a first aspect of the present invention, there is provided an image forming apparatus that installs an operation program of an extension application therein, and includes a VM (Virtual Machine) that executes a bytecoded program generated by converting the operation program to bytecode, comprising a generation unit configured to generate the bytecoded program by converting the operation program to bytecode, a writing unit configured to write the operation program and the bytecoded program into a package, and a storage unit configured to store the package.

In a second aspect of the present invention, there is provided a method of controlling an image forming apparatus that installs an operation program of an extension application therein, and includes a VM (Virtual Machine) that executes a bytecoded program generated by converting the operation program to bytecode, comprising generating the bytecoded program by converting the operation program to bytecode, writing the operation program and the bytecoded program into a package, and storing the package.

In a third aspect of the present invention, there is provided a non-transitory computer-readable storage medium storing a computer-executable program for executing a method of controlling an image forming apparatus that installs an operation program of an extension application therein, and includes a VM (Virtual Machine) that executes a bytecoded program generated by converting the operation program to bytecode, wherein the method comprises generating the bytecoded program by converting the operation program to bytecode, writing the operation program and the bytecoded program into a package, and storing the package.

According to the present invention, it is possible to prevent compatibility with the extension application from being impaired.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

In the present embodiment, the description is given of a case where the present invention is applied to an MFP (Multifunction Peripheral) as an example of an image forming apparatus. However, the present invention may be applied to a printer as an image forming apparatus, and further may be applied to an image forming apparatus which is not equipped with a printing function, such as a server, a PC, and a smart home electric appliance. More specifically, the present invention can be applied to any image forming apparatus, insofar as it adds in a script which is an operation program of an extension application, and starts the extension application by executing the script. Further, component elements described in the present embodiment are given only by way of example, and the scope of the present invention is not limited by the component elements described in the present embodiment.

Figure 1:
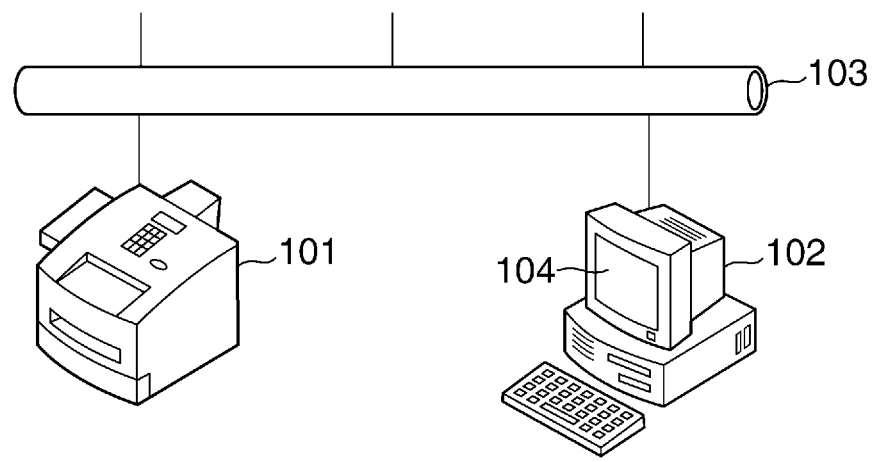
FIG. 1 is a schematic network diagram of a communication system including an MFP as an image forming apparatus according to an embodiment of the present invention.

FIG. 1 is a schematic network diagram of a communication system 100 including an MFP 101 as an image forming apparatus according to an embodiment of the present invention.

Referring to FIG. 1, the communication system 100 includes the MFP 101 and a PC 102 having a display section 104, and the MFP 101 and the PC 102 are connected to each other by Ethernet (registered trademark) 103.

Figure 4:
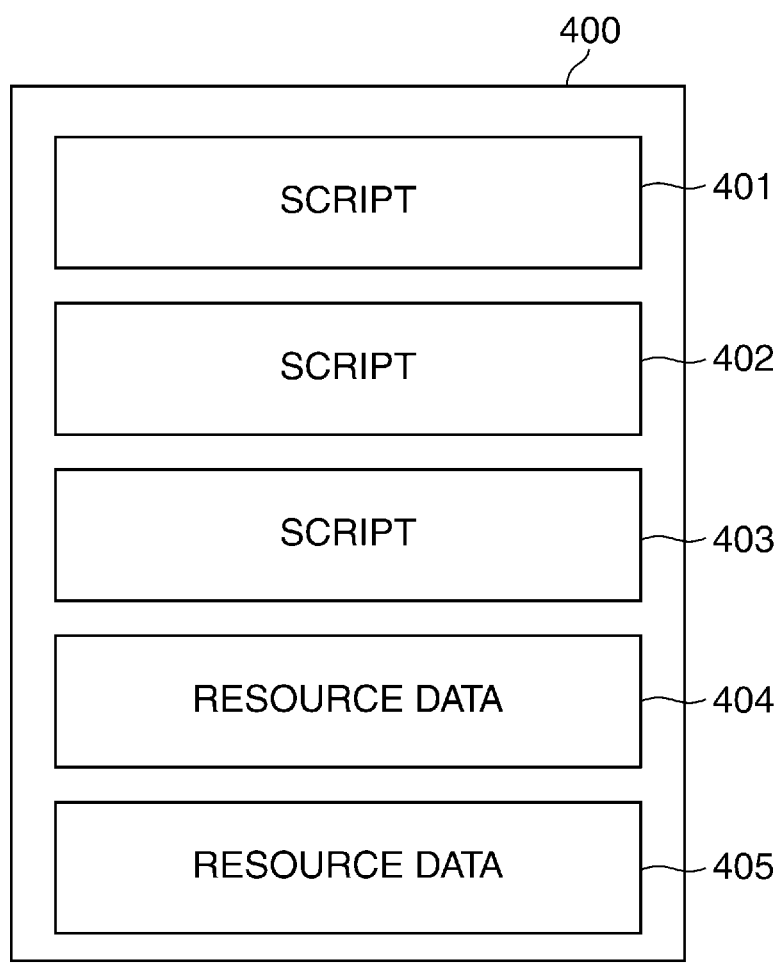
FIG. 4 is a diagram showing an example of an archive acquired from a PC appearing in FIG. 1 by the MFP.

The MFP 101 is capable of executing a job, such as a copy job and a scan job, and further, is capable of extending its function by installing an extension application anew. For example, the MFP 101 adds in a script of an extension application, included in an archive 400, described hereinafter with reference to FIG. 4, which is acquired from the PC 102 via Ethernet 103, and starts the extension application by executing the script. The PC 102 performs data communication with the MFP 101, and transmits e.g. print data to be printed by the MFP 101, and the archive 400, to the MFP 101.

Figure 2:
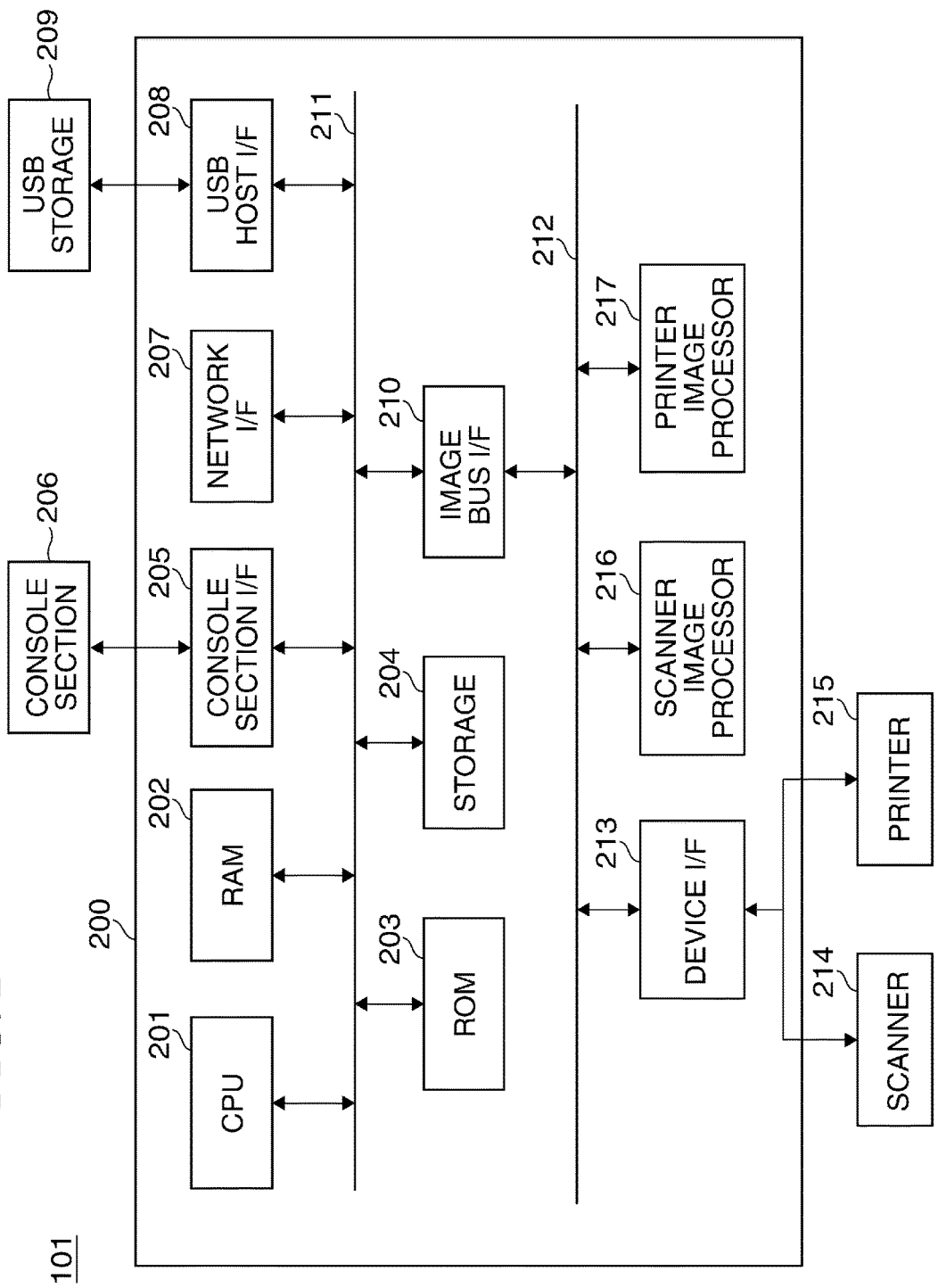
FIG. 2 is a schematic block diagram of the MFP appearing in FIG. 1.

FIG. 2 is a schematic block diagram of the MFP 101 appearing in FIG. 1.

Referring to FIG. 2, the MFP 101 includes a controller unit 200, a console section 206, a USB storage 209, a scanner 214, and a printer 215. The controller unit 200 is connected to the console section 206, the USB storage 209, the scanner 214, and the printer 215. The controller unit 200 includes a CPU 201, a RAM 202, a ROM 203, a storage 204, a console section interface 205, a network interface 207, a USB host interface 208, and an image bus interface 210. The controller unit 200 further includes a device interface 213, a scanner image processor 216, and a printer image processor 217. The CPU 201, the RAM 202, the ROM 203, the storage 204, the console section interface 205, the network interface 207, the USB host interface 208, and the image bus interface 210 are interconnected via a system bus 211. The image bus interface 210, the device interface 213, the scanner image processor 216, and the printer image processor 217 are interconnected via an image bus 212.

The controller unit 200 controls the console section 206, the USB storage 209, the scanner 214, and the printer 215, connected thereto. The CPU 201 executes a boot program stored in the ROM 203 to thereby start an operating system (OS) 301, described hereinafter with reference to FIG. 3, and executes programs stored in the storage 204 on the started OS 301 to thereby perform various processing operations. The RAM 202 is used as a work area for the CPU 201, and is also used as an area for temporarily storing image data, etc. The ROM 203 stores the boot program and the like executed by the CPU 201. The storage 204 stores the programs, image data, and so forth. The console section interface 205 outputs information input by a user on the console section 206 to the CPU 201. The console section 206 includes a touch panel-type display and a plurality of operation keys, and receives instructions input by the user. The network interface 207 is an interface for connecting the MFP 101 to a LAN. The USB host interface 208 is an interface for communicating with the USB storage 209, and outputs data stored in the storage 204 to the USB storage 209 so as to cause the same to be stored therein. Further, the USB host interface 208 receives data stored in the USB storage 209, and transfers the received data to the CPU 201. The USB storage 209 can be attached and removed to and from the USB host interface 208. Note that a plurality of USB devices including the USB storage 209 can be connected to the USB host interface 208.

The image bus interface 210 is a bus bridge for converting a data format, and connects between the system bus 211 and the image bus 212. The image bus 212 is implemented by a PCI bus, an IEEE 1394 bus, or the like, and transfers image data at high speed. The scanner 214 as an image input device and the printer 215 as an image output device are connected to the device interface 213, and the device interface 213 performs synchronous-to-asynchronous or asynchronous-to-synchronous conversion of image data. The scanner 214 reads an original placed on an original platen glass, not shown, and generates image data based on the read information. The printer 215 prints e.g. image data generated by the scanner 214. The scanner image processor 216 corrects, processes, or edits image data generated by the scanner 214. The printer image processor 217 performs correction and resolution conversion on image data to be transmitted to the printer 215 according to the characteristics of the printer 215.

Figure 3:
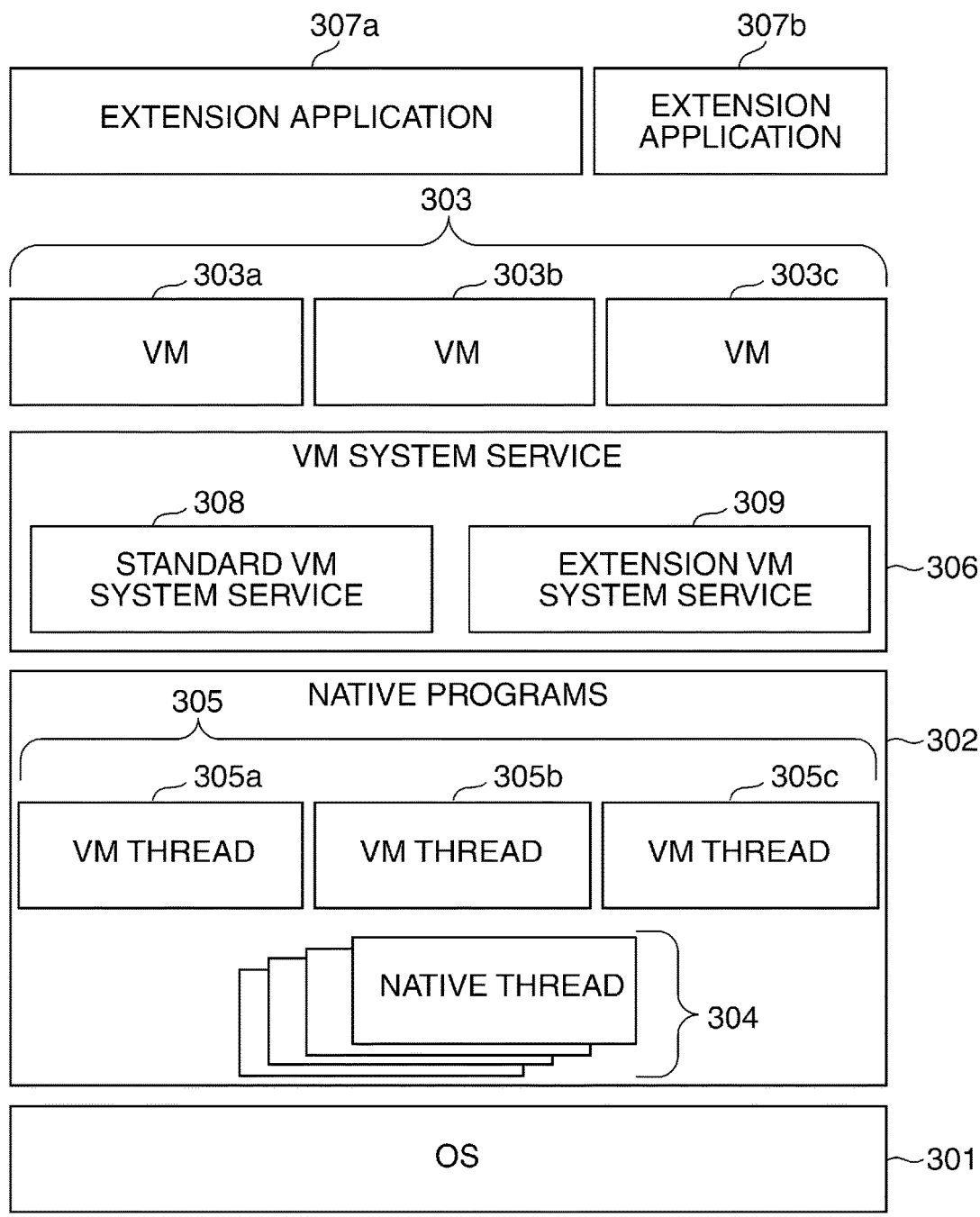
FIG. 3 is a block diagram useful in explaining an example of an execution environment of an extension application in the MFP appearing in FIG. 1.

FIG. 3 is a block diagram useful in explaining an example of an execution environment of an extension application in the MFP 101 appearing in FIG. 1. In the present embodiment, the following modules, shown in FIG. 3, are realized on the OS by the CPU 201 that loads programs stored in the ROM 203 or the storage 204 into the RAM 202, and executes the loaded programs.

Referring to FIG. 3, native programs 302 for realizing the printer function, the FAX function, and the scanner function, and VMs 303 operate on the OS 301 started by the CPU 201. Each VM 303 is a module that understands and executes a program for controlling an extension application, and the extension application necessarily operates on the VM 303. The VM 303 executes a program generated by converting (bytecoding) a native code, which is a program code interpretable by the CPU 201, to bytecode dedicated to the exclusive use of the VM. As an example of the VM 303, there is a virtual machine which can interpret a script in Lua language (Lua script). The Lua language is a so-called general-purpose script language, and has characteristics which are not limited to a specific use. As another example of the VM 303, a virtual machine of Java (registered trademark) can also be applied.

Native threads 304 for controlling image processing units, such as the printer 215 and the scanner 214, and VM threads 305 for operating the VMs 303 form the native programs 302. In the present embodiment, three VMs 303a, 303b, and 303c are each generated as the VM 303. Further, three VM threads 305a, 305b, and 305c, corresponding in number to the total number of the VMs 303a, 303b, and 303c, are each generated as the VM thread 305. A VM system service 306 is a utility library which is commonly used by extension applications 307a and 307b, and provides a plurality of functions. The extension applications 307a and 307b each select a function necessary for executing the self-application from the VM system service 306. In the MFP 101, by calling a function provided by the VM system service 306 from each of the extension applications 307a and 307b, it is possible to reduce time and effort for developing the extension application, and further, it is possible to access each module of the MFP 101. The VM system service 306 includes a standard VM system service 308 and an extension VM system service 309 as modules. The standard VM system service 308 provides basic services, such as "open", "close", "read", and "write", performed with respect to the file system of the MFP 101, and realizes minimum functions necessary for each VM 303 to function as the VM. Further, the standard VM system service 308 loads scripts as the operation programs of the extension applications 307a and 307b. The extension VM system service 309 realizes a function of accessing each module of the MFP 101, and the functions of the OS 301.

Each VM 303 interprets and executes each of respective scripts of the extension applications 307a and 307b. Note that in the present embodiment, the VM 303 may execute a bytecode program by converting the same to a native code. The VM 303 is generated for each thread of the extension application. In the execution environment, shown in FIG. 3, the two VM threads 305a and 305b are generated for the extension application 307a, and the two VMs 303a and 303b are generated in association with the VM threads 305a and 305b, respectively. Further, the one VM thread 305c is generated for the extension application 307b, and the one VM 303c is generated in association with the VM thread 305c.

Referring again to FIG. 2, icons indicative of the extension applications 307a and 307b, respectively, are displayed on a screen of the console section 206 of the MFP 101. When selection of one of the icons by the user is detected by the console section interface 205 via the console section 206, the console section interface 205 sends this detection result to the CPU 201. Upon receipt of the detection result, the CPU 201 starts the extension application 307a or 307b selected by the user.

Next, a process for installing an extension application in the MFP 101 will be described. When installing an extension application, the user transmits the archive 400, shown in FIG. 4, including a plurality of data items necessary for executing the extension application, e.g. from the PC 102 to the MFP 101. The archive 400 includes scripts 401 to 403 and resource data items 404 and 405. The scripts 401 to 403 are the operation programs of the extension application, in which the operations of the extension application are described in the native code. The resource data items 404 and 405 are image data items, messages, etc., which are necessary for using the extension application. The MFP 101 having acquired the archive 400 loads the archive 400 e.g. into the RAM 202, and performs a process in FIG. 5.

Figure 5:
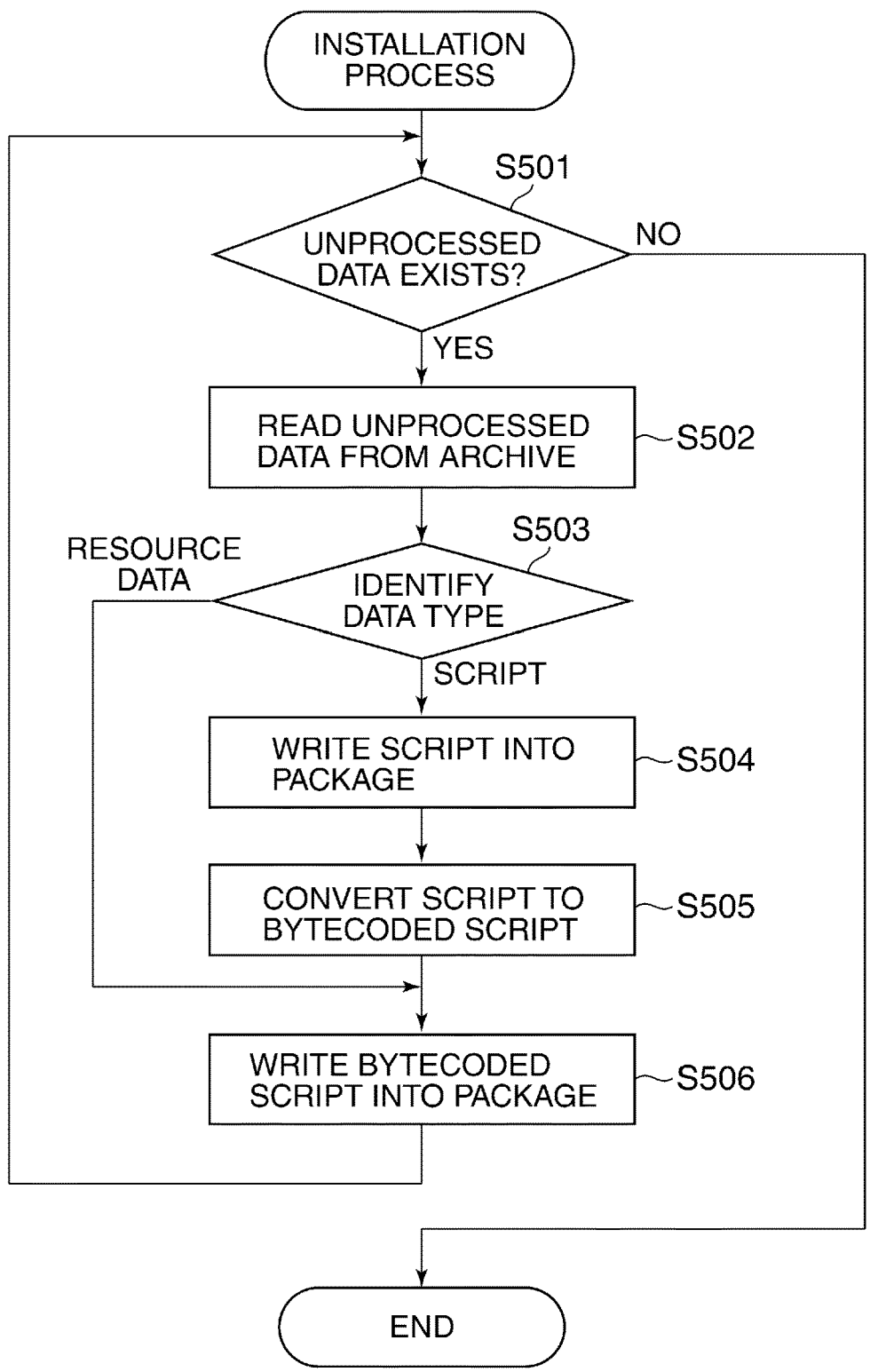
FIG. 5 is a flowchart of an installation process performed by the MFP.

FIG. 5 is a flowchart of the installation process performed by the MFP 101.

The installation process in FIG. 5 is started when the CPU 201 is instructed to execute the program stored in the ROM 203 or the storage 204. The execution instruction is provided by another program or a user.

Figure 6:
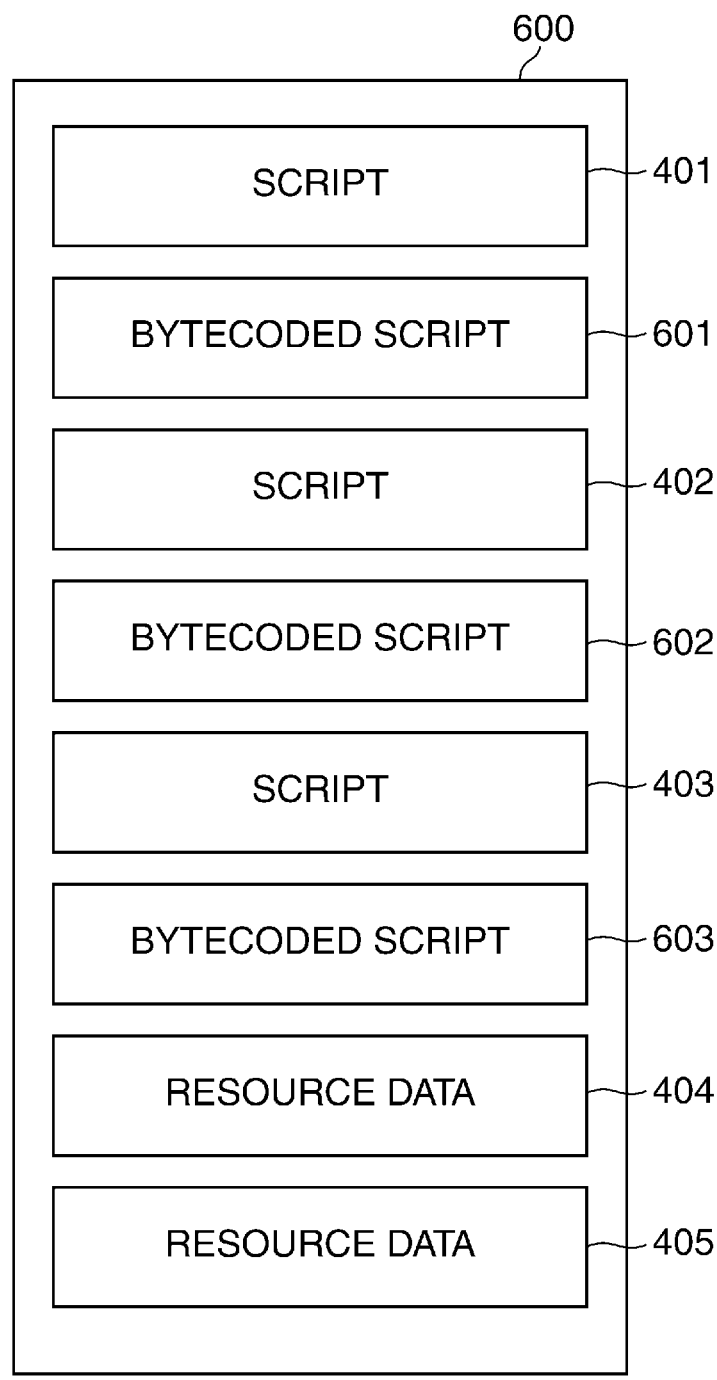
FIG. 6 is a diagram showing an example of a package stored in the MFP.

Referring to FIG. 5, first, the CPU 201 determines whether or not any unprocessed data item which has not been written into a package 600 yet, shown in FIG. 6, exists in the plurality of data items included in the archive 400 (step S501).

If it is determined in the step S501 that any unprocessed data item exists, the CPU 201 reads the unprocessed data item from the archive 400 (step S502), and identifies the type of the read data item (step S503). More specifically, the CPU 201 determines whether the read data item is a script or a resource data item.

If it is determined in the step S503 that the read data is a script, the CPU 201 writes the read script into the package 600 (step S504). Then, the CPU 201 converts the read script to bytecode to thereby generate a bytecoded script (bytecode program) (step S505). Then, the CPU 201 writes the generated bytecoded script into the package 600, shown in FIG. 6, which is stored e.g. in the RAM 202 (step S506), and returns to the step S501.

If it is determined in the step S503 that the read data item is a resource data item, the CPU 201 executes the step S506 et seq. In the present embodiment, the steps S501 to S506 are executed for all of the data items included in the archive 400. As a result, the scripts 401 to 403 and the resource data 404 and 405, which are included in the archive 400, and further, bytecoded scripts 601 to 603 generated by bytecoding the scripts 401 to 403, respectively, are written into the package 600. Note that the bytecoded script 601 is a script to be executed first by the VM 303 when starting the extension application.

If it is determined in the step S501 that no unprocessed data item exists, the CPU 201 terminates the present process.

By performing the above-described process in FIG. 5, all of the data items included in the archive 400 are written into the package 600. Here, in the conventional technique, the storage destination of each data item included in the archive 400 is determined depending on the file system of the MFP 101. Therefore, to read data necessary for operating the extension application, it is necessary to retrieve a storage destination of the data, and further, and retrieve desired data from the retrieved storage destination, and hence load of retrieval processing is large. On the other hand, in the present embodiment, all of the data items included in the archive 400 are written into the package 600, which is stored e.g. in the RAM 202. That is, each data item included in the archive 400 is stored in a predetermined storage destination, more specifically, in the package 600. This makes it possible to eliminate the need of retrieving a storage destination of each data item, whereby it is possible to reduce the load of retrieval processing.

Next, a process performed when the controller unit 200 is started will be described. When the controller unit 200 is started, the VM threads 305 and the VMs 303 are generated by the MFP 101, whereby the extension applications 307a and 307b can be started.

Figure 7:
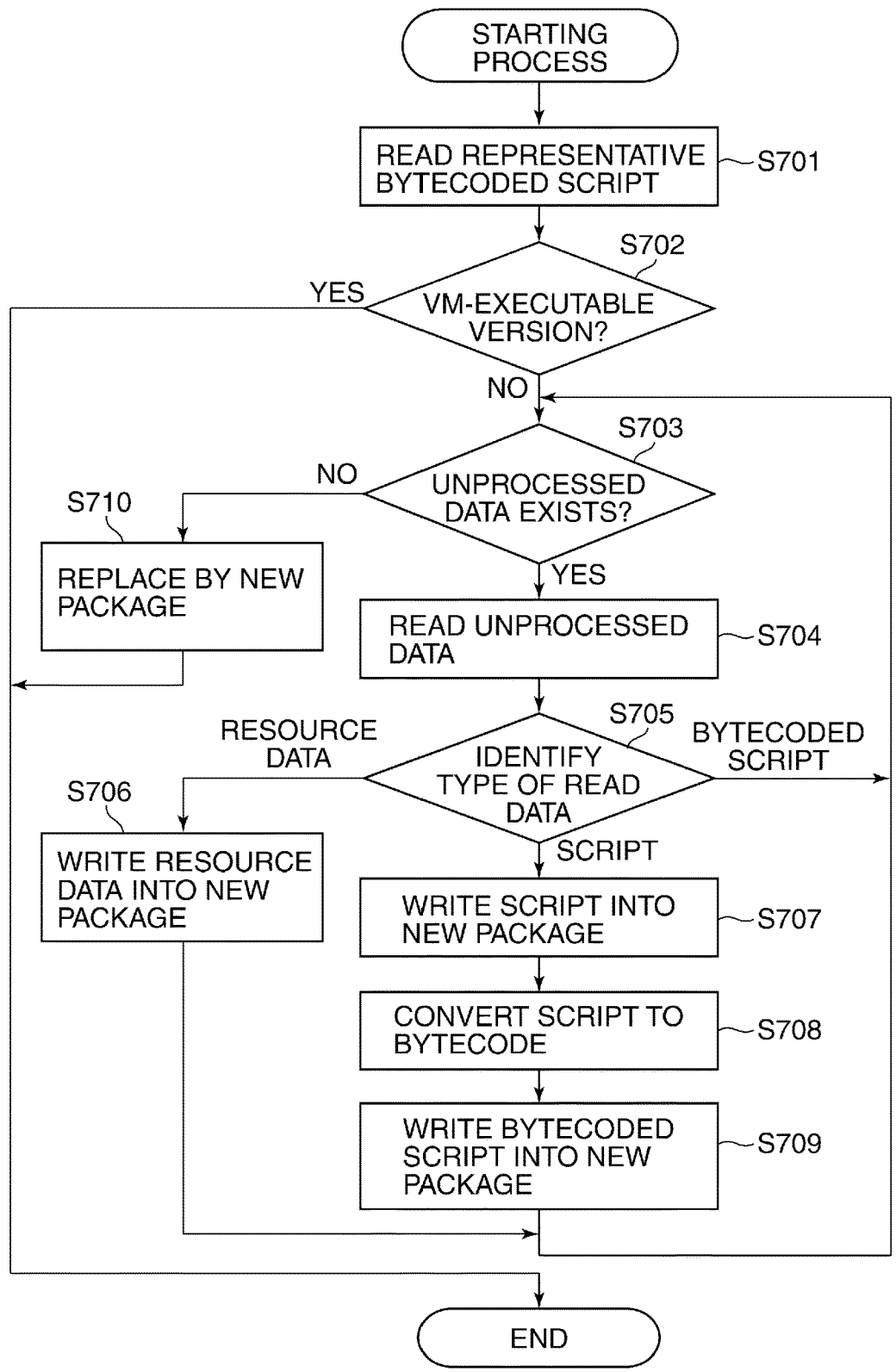
FIG. 7 is a flowchart of a process for starting a controller unit, which is performed by the MFP.

FIG. 7 is a flowchart of a process for starting the controller unit 200, which is performed by the MFP 101.

The process in FIG. 7 is started when the CPU 201 is instructed to execute an associated program stored in the ROM 203 or the storage 204. The execution instruction is provided by a user or another program (not shown). The process in FIG. 7 is performed for each of the installed extension applications 307a and 307b, and the following description is given of a case where the process is performed for the extension application 307a, by way of example.

Referring to FIG. 7, first, the CPU 201 reads, from the package 600, a representative bytecoded script which is one of the bytecoded scripts (step S701). The representative bytecoded script is the bytecoded script 601 of the bytecoded scripts 601 to 603 written into the package 600, which is to be executed first by the VM 303 when starting the extension application 307a. Then, the CPU 201 determines whether or not the bytecode of the read representative bytecoded script is bytecode of a version which can be executed by the VM 303 (step S702).

If it is determined in the step S702 that the bytecode of the read representative bytecoded script is bytecode of a version which can be executed by the VM 303, the CPU 201 terminates the present process.

If it is determined in the step S702 that the bytecode of the read representative bytecoded script is not bytecode of a version which can be executed by the VM 303, the CPU 201 generates a new package which is different from the package 600 and stores the same in the storage 204. To this end, the CPU 201 executes steps S704 to S709, described hereinafter, so as to write data items included in the package 600 into the new package. The CPU 201 determines whether or not the package 600 contains any unprocessed data item, i.e. any data item which has not been subjected to processing of the steps S704 to S709 described hereinafter (step S703).

If it is determined in the step S703 that the package 600 contains any unprocessed data item, the CPU 201 reads the unprocessed data item from the package 600 (step S704), and identifies the type of the read data item (step S705). In the present embodiment, the type of the read data item is one of script, bytecode, and resource data.

If it is determined in the step S705 that the type of the read data is resource data, the CPU 201 writes the read data item into the new package (step S706), and returns to the step S703.

If it is determined in the step S705 that the type of the read data is script, the CPU 201 writes the read data item into the new package (step S707). Then, the CPU 201 generates a new bytecoded script by converting the read data item to bytecode of the version which can be executed by the VM 303 (step S708). Then, the CPU 201 writes the newly generated bytecoded script into the new package (step S709), and returns to the step S703.

If it is determined in the step S705 that the type of the read data item is bytecode, the CPU 201 returns to the step S703. That is, in the present embodiment, a new package is generated in which the bytecoded scripts 601 to 603 in the package 600 are replaced by the new bytecoded scripts in the version of bytecode which can be executed by the VM 303.

If it is determined in the step S703 that the package 600 contains no unprocessed data item, the CPU 201 stores the new package as the package 600 in place of the existing package 600 and deletes the existing package 600 (step S710), followed by terminating the present process.

In the present embodiment, the same process is performed also for the installed extension application 307b. More specifically, the CPU 201 reads the representative bytecoded script of the extension application 307b from the package 600. If the bytecode of the representative bytecoded script is not bytecode of a version which can be executed by the VM 303, the CPU 201 generates new bytecoded scripts in the version of bytecode which can be executed by the VM 303, based on the scripts 401 to 403 of the extension application 307b, included in the package 600. The CPU 201 writes the scripts 401 to 403 of the extension application 307b and the resource data items 404 and 405, which are included in the existing package 600, and the newly generated bytecoded scripts, into the new package 600.

According to the present embodiment, the scripts 401 to 403, and the bytecoded scripts 601 to 603, generated by converting the scripts 401 to 403 to bytecode are written into the package 600, and the package 600 is stored. That is, even when the VM 303 cannot execute the bytecoded scripts 601 to 603, it is possible to cope with this state based on the scripts 401 to 403 such that it becomes possible to start the extension applications 307a and 307b. This makes it possible to prevent compatibility with the extension applications 307a and 307b from being impaired.

Further, in the present embodiment, if the bytecode of the bytecoded scripts 601 to 603 is not bytecode of a version which can be executed by the VM 303, new bytecoded scripts in the version of bytecode which can be executed by the VM 303, are generated based on the scripts 401 to 403 written in the package 600. As a result, even when the VM 303 cannot execute the bytecoded scripts 601 to 603 written in the package 600, it is possible to positively start the extension applications 307a and 307b by executing the newly generated bytecoded scripts.

Further, in the present embodiment, the determination processing in the step S702 is performed for one of the bytecoded scripts 601 to 603. This makes it possible to minimize load of the determination processing necessary for ensuring compatibility with the extension applications 307a and 307b.

Further, in the present embodiment, the representative bytecoded script is the bytecoded script 601 of the bytecoded scripts 601 to 603, which is to be executed first by the VM 303 when starting the extension application 307a. That is, whether or not it is necessary to generate new bytecoded scripts is determined at a relatively early stage after receiving an instruction for starting the extension application 307a. This makes it possible to quickly cope with a case where the bytecode of the bytecoded scripts 601 to 603 is not bytecode of a version which can be executed by the VM 303.

In the present embodiment, the scripts 401 to 403 and the new bytecoded scripts are written into a new package, and the new package is stored. Therefore, after that, when an instruction for starting the extension application 307a or 307b is received, it is unnecessary to perform bytecoding for generating new bytecoded scripts again. This makes it possible for the MFP 101 having an execution environment compatible with the new bytecoded scripts to start the extension applications 307a and 307b without delay.

Further, in the present embodiment, the existing package 600 is deleted when a new package is stored, and hence it is possible to eliminate the need of excessively ensuring the capacity of the storage 204 to ensure compatibility with the extension applications 307a and 307b.

Note that in the present embodiment, the existing package 600 may also be stored when a new package is stored. By storing the existing package 600 together with the new package, even when the version of the VM 303 is restored to the older version, it is possible to easily start the extension applications 307a and 307b by executing the bytecoded scripts 601 to 603 in the package 600 without bytecoding the scripts.

Further, in the above-described embodiment, a plurality of VMs which are different in version of the executable bytecode may be generated, and the bytecoded scripts 601 to 603 may be loaded into a VM which can execute the version of bytecode of the bytecoded scripts 601 to 603. This makes it possible to positively prevent compatibility with the extension applications 307a and 307b from being impaired.

Further, in the present embodiment, if there is half-processed data for generating a new bytecoded script, the half-processed data may be deleted before execution of the step S701. Here, if the MFP 101 is powered off when a new bytecoded script is being generated, the half-processed data remains in the MFP 101, which reduces the capacity of the storage 204 of the MFP 101. To cope with this, in the present embodiment, if there is half-processed data for generating a new bytecoded script, the half-processed data may be deleted before execution of the step S701. This makes it possible to prevent the half-processed data from continuing to remain in the MFP 101, whereby it is possible to avoid a situation in which the capacity of the storage 204 of the MFP 101 is reduced by the half-processed data remaining in the MFP 101.

Although in the present embodiment, the description is given of the case where the new bytecoded scripts are generated when the controller unit 200 is started, the new bytecoded scripts may be generated at another timing. For example, the new bytecoded scripts may be generated when the execution environment of the MFP 101 is updated. By doing this, even when the VM 303 cannot execute the bytecoded scripts 601 to 603 due to the update of the execution environment of the MFP 101, it is possible to positively provide new bytecoded scripts for starting the extension applications 307a and 307b.

Next, a description will be given of debugging for the installed extension applications 307a and 307b.

Figure 8:
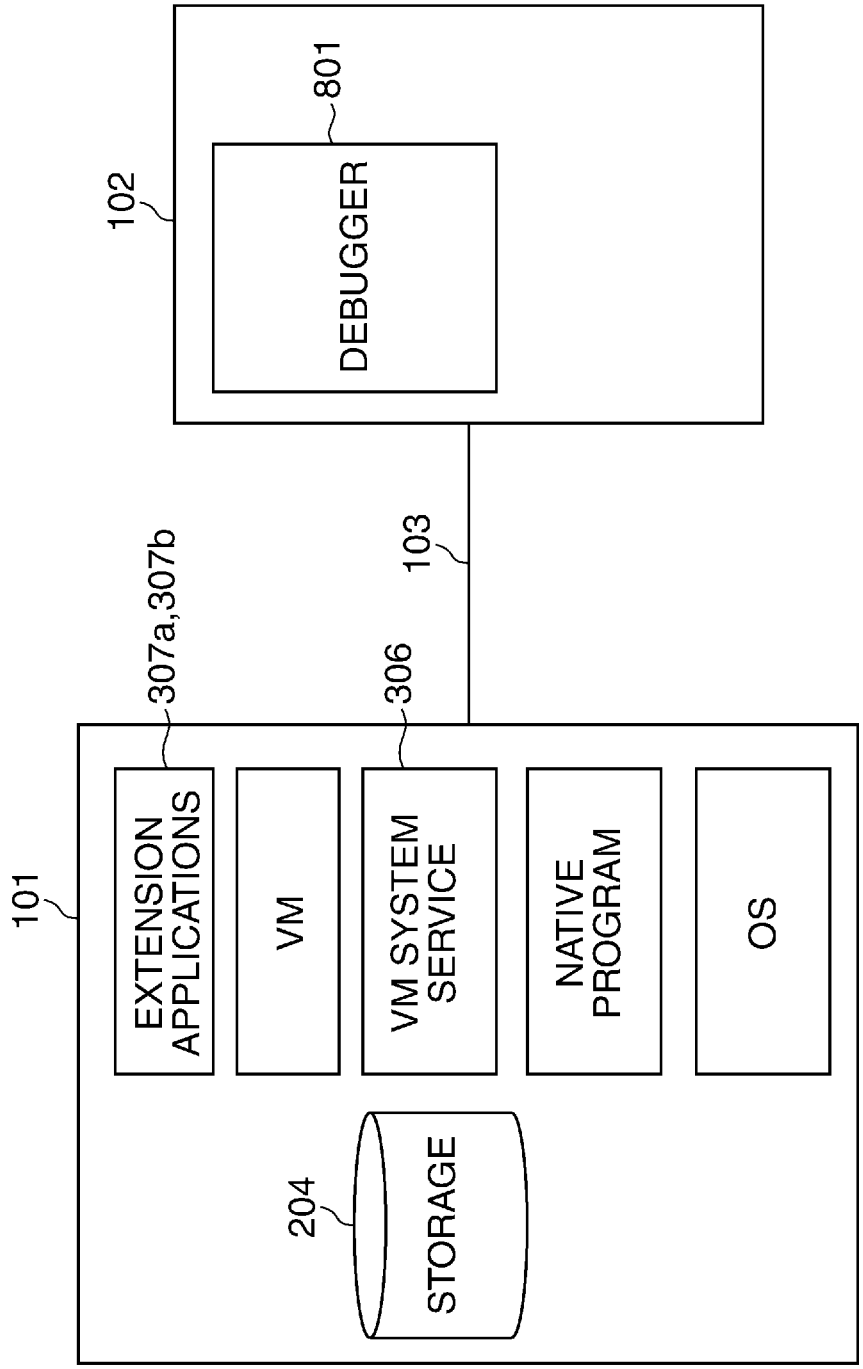
FIG. 8 is a diagram useful in explaining a debugger installed in the PC.

The MFP 101 has a debug function, and performs debugging for the installed extension applications 307a and 307b. The MFP 101 is capable of performing debugging for the installed extension applications 307a and 307b by performing data communication with the PC 102 via Ethernet 103. Note that in the present embodiment, the data communication for debugging between the MFP 101 and the PC 102 is not limited to data communication via Ethernet 103, but may be performed by communication using a USB cable, communication via a serial cable, or wireless communication. The PC 102 includes a debugger 801, appearing in FIG. 8. The debugger 801 operates the VM system service 306 via Ethernet 103 to perform correction of the extension applications 307a and 307b by updating data in the storage 204, and perform setting of a break point for intentionally temporarily stopping the program being executed.

Figure 9:
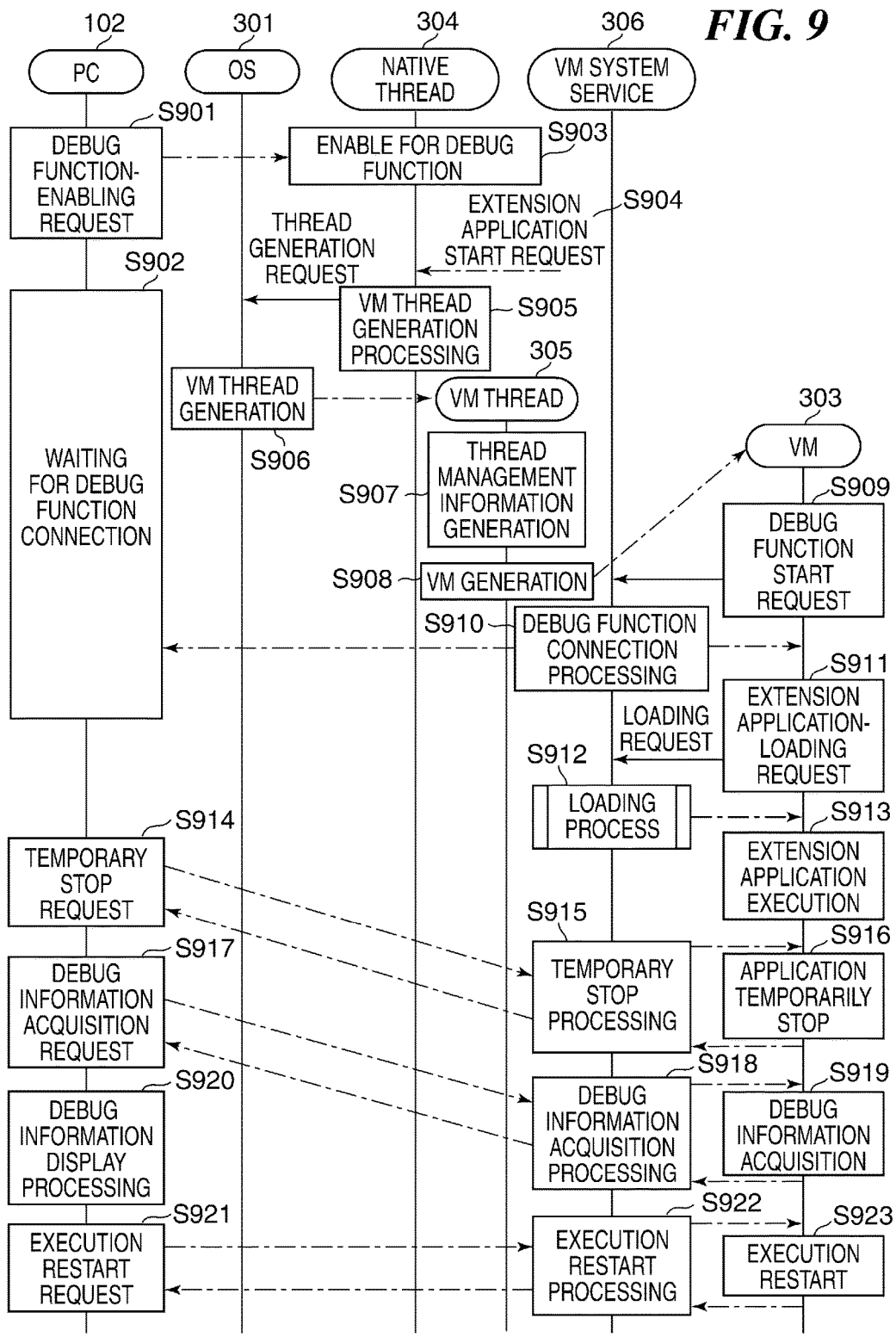
FIG. 9 is a sequence diagram of a debug control process performed by the MFP and the PC.

FIG. 9 is a sequence diagram of a debug control process performed by the MFP 101 and the PC 102.

First, the PC 102 transmits a debug function-enabling request for enabling the debug function of the MFP 101 to the MFP 101 (step S901). The debug function-enabling request includes debug connection destination information indicative of an apparatus as a communication partner of the MFP 101 during debugging, specifically, the PC 102. The PC 102 waits until debug function connection with the MFP 101 for realizing the debug function is performed (step S902).

Upon receipt of the debug function-enabling request from the PC 102, the native threads 304 of the MFP 101 enable the debug function (step S903), and store the debug connection destination information. Then, upon receipt of a request for starting the extension application to be debugged (step S904), the native threads 304 perform processing for generating a VM thread for operating the extension application requested to be started (step S905). At this time, the native threads 304 send a thread generation request to the OS 301. The OS 301 having received the thread generation request generates the VM thread 305 based on the thread generation request (step S906). The generated VM thread 305 generates thread management information, not shown, for managing the thread (step S907), and generates the VM 303 for executing the extension application requested to be started (step S908). The generated VM 303 sends a debug function start request to the VM system service 306 (step S909).

Upon receipt of the debug function start request, the VM system service 306 performs debug function connection processing (step S910), and connects to the PC 102 indicated by the stored debug connection destination information (debug function connection). This enables communication for exchanging information on debugging between the VM system service 306 and the PC 102. Then, the VM 303 sends a request for loading the extension application requested to be started to the VM system service 306 (step S911). The VM system service 306 having received the loading request performs a loading process, described hereinafter with reference to FIG. 11 (step S912), and loads the bytecoded scripts of the requested extension application. Then, the VM 303 executes the extension application based on the loaded bytecoded scripts (step S913).

The PC 102 transmits a request for temporarily stopping the extension application being executed to the VM system service 306 (step S914). Upon receipt of the temporary stop request, the VM system service 306 performs temporary stop processing (step S915) to thereby instruct the VM 303 to temporarily stop the extension application being executed. The VM 303 temporarily stops the extension application being executed according to the instruction from the VM system service 306 (step S916). When the extension application being executed is stopped, the VM 303 sends a completion notification indicative of completion of the processing corresponding to the temporary stop instruction to the VM system service 306. The VM system service 306 having received the completion notification notifies the PC 102 of completion of the processing corresponding to the temporary stop request.

Figure 10:
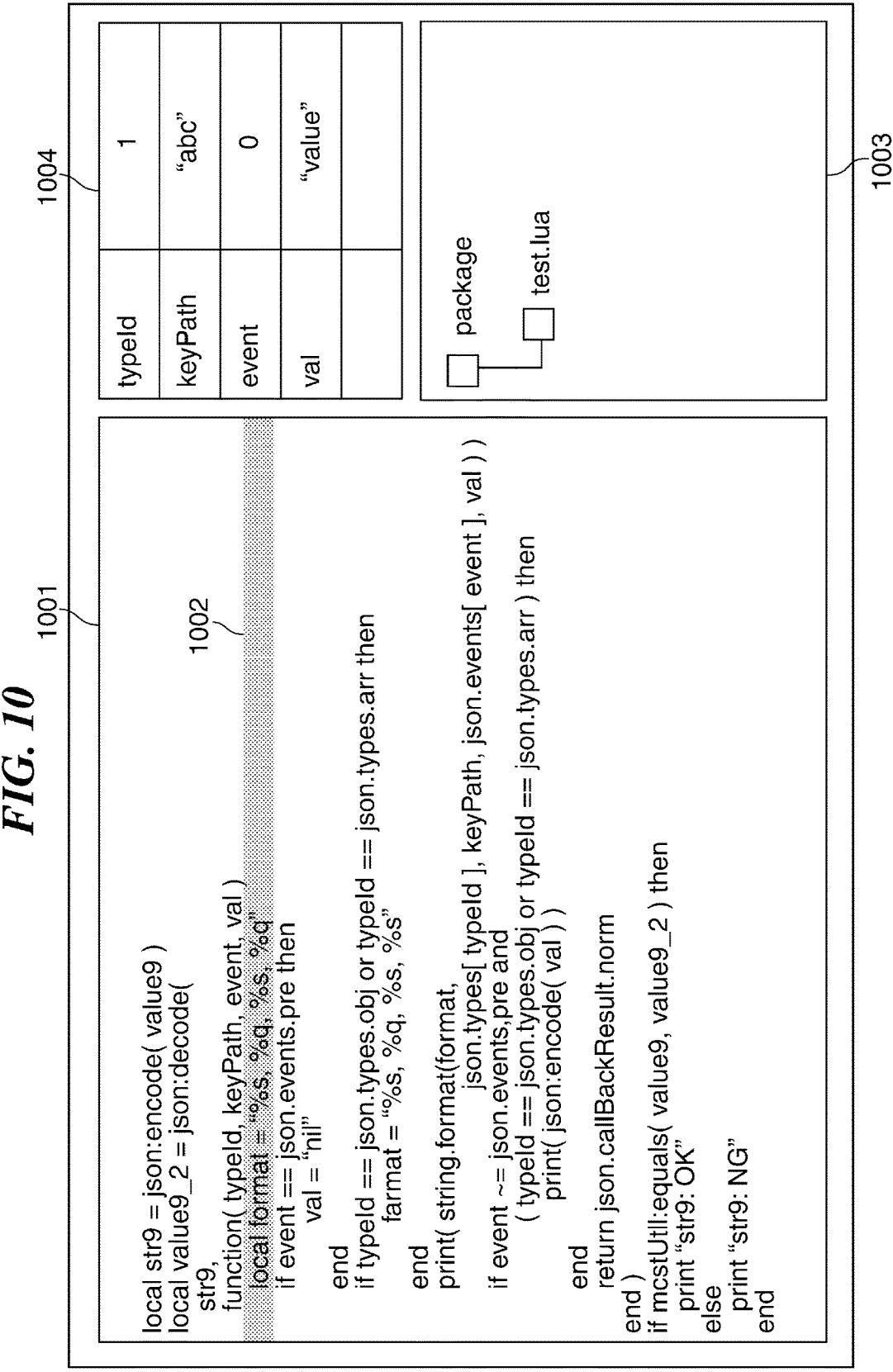
FIG. 10 is a diagram showing an example of information on debugging displayed on the PC.

Then, the PC 102 transmits a debug information acquisition request to the VM system service 306 to acquire a state of the stopped extension application (step S917). Upon receipt of the debug information acquisition request, the VM system service 306 performs debug information acquisition processing (step S918), and instructs the VM 303 to output debug information. The debug information includes the script, file name, row number indicative of the temporarily stopped position, values of the set variables, and so forth, of the extension application which has been temporarily stopped by the processing in the step S916. The VM 303 instructed to output the debug information acquires the debug information according to the instruction (step S919). In the present embodiment, the script as the debug information is not a bytecoded script, but a native code script. Therefore, when the VM 303 accesses the package 600 to acquire the script as the debug information, the VM 303 performs not load access for loading a script into the VM 303, but text data access for acquiring the native code script. Then, the VM 303 outputs the acquired debug information to the VM system service 306. The VM system service 306 having received the debug information transmits the debug information to the PC 102. The PC 102 performs debug information display processing based on the received debug information (step S920), and displays the information on debugging of the temporarily stopped extension application on the display section 104. The information on debugging includes, for example, a user-readable native code script 1001, a temporarily stopped position 1002, a tree structure 1003 of the script, and values 1004 of set variables, as shown in FIG. 10. Note that in the present embodiment, the contents of the script displayed on the display section 104 may be edited by the user, and the edited script may be transmitted to the MFP 101.

Then, the PC 102 transmits a request for restarting execution of the extension application to the VM system service 306 (step S921). Upon receipt of the execution restart request, the VM system service 306 performs execution restart processing (step S922), and instructs the VM 303 to restart execution of the extension application being temporarily stopped. The VM 303 having received the restart instruction restarts execution of the extension application being temporarily stopped (step S923). When execution of the extension application is restarted, the VM 303 sends a restart completion notification indicative of completion of the processing corresponding to the restart instruction to the VM system service 306. The VM system service 306 having received the restart completion notification notifies the PC 102 of completion of the processing corresponding to the execution restart request. After that, the above-described processing is repeatedly performed until execution of the extension application is completed, and the MFP 101 and the PC 102 terminate the present process.

In the present embodiment, the debug information is transmitted from the MFP 101 to the PC 102. With this, even when the same script as the script of the extension application being executed in the MFP 101 is not stored in the PC 102, it is possible to easily analyze the result of execution of the script from the PC 102.

Further, in the above-described present embodiment, the contents of the script displayed on the display section 104 are edited by the user, and the edited script is transmitted to the MFP 101. This makes it possible to easily edit the script from the PC 102.

Figure 11:
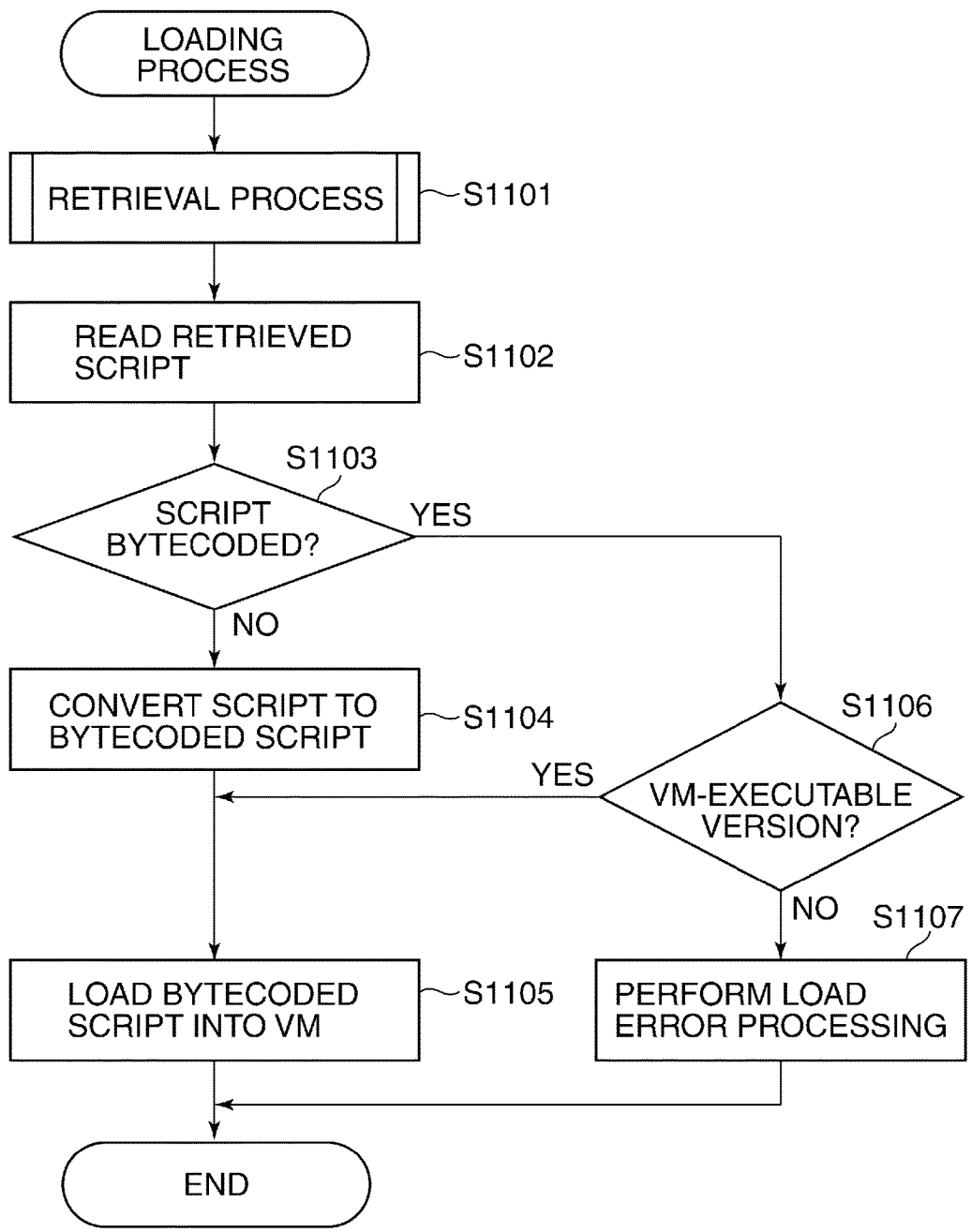
FIG. 11 is a flowchart of a loading process performed in a step in FIG. 9.

FIG. 11 is a flowchart of the loading process performed in the step S912 in FIG. 9.

Referring to FIG. 11, the VM system service 306 performs a retrieval process, described hereinafter with reference to FIG. 12 (step S1101) to retrieve a script of a designated extension application from the package 600. Then, the VM system service 306 reads the retrieved script (step S1102), and determines whether or not the read script has been bytecoded (step S1103).

If it is determined in the step S1103 that the read script has not been bytecoded, the VM system service 306 converts the script to bytecode (step S1104). Then, the VM system service 306 loads the bytecoded script into the VM 303 (step S1105), followed by terminating the present process.

If it is determined in the step S1103 that the read script has been bytecoded, the VM system service 306 determines whether or not the bytecode of the read script is bytecode of a version which can be executed by the VM 303 (step S1106).

If it is determined in the step S1106 that the bytecode of the read script is bytecode of a version which can be executed by the VM 303, the VM system service 306 proceeds to the step S1105.

If it is determined in the step S1106 that the bytecode of the read script is not bytecode of a version which can be executed by the VM 303, the VM system service 306 performs load error processing (step S1107), followed by terminating the present process.

Figure 12:
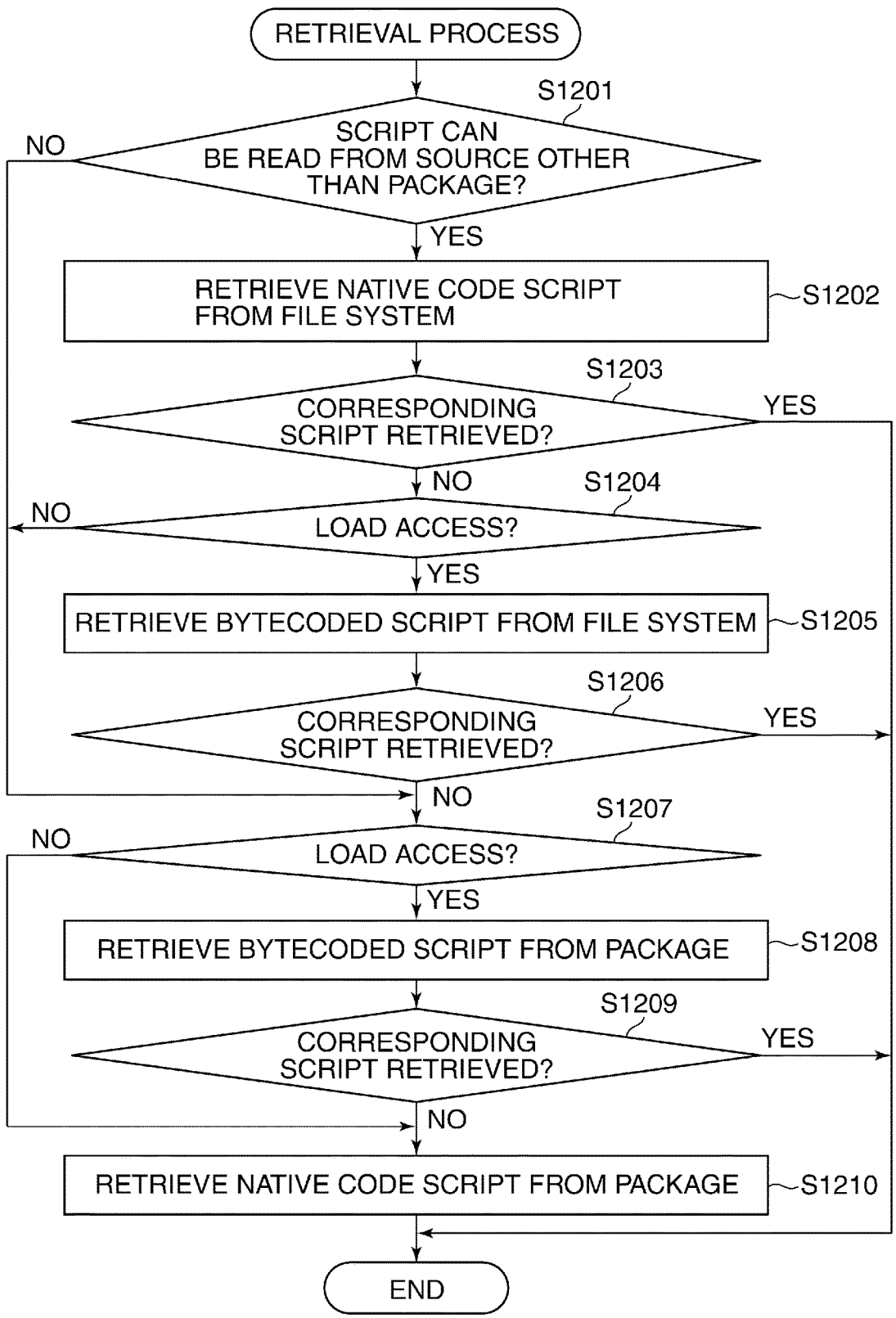
FIG. 12 is a flowchart of a retrieval process performed in a step in FIG. 11.

FIG. 12 is a flowchart of the retrieval process performed in the step S1101 in FIG. 11.

Referring to FIG. 12, the VM system service 306 determines whether or not a script can be read from a source other than the package (step S1201). In the following description, the package 600 and a new package are collectively referred to as the package. Here, if debugging is performed after an extension application being developed is written into the package, the efficiency of debugging is lowered. For this reason, when an extension application being developed is debugged in the MFP 101, a script to be debugged is retrieved not from the package, but from the aforementioned file system. In the step S1201, if the debug function is enabled to debug the extension application being developed, reading of a script from the aforementioned file system is permitted. In this case, the VM system service 306 determines that it is possible to read a script from a source other than the package. On the other hand, if the debug function is disabled, the VM system service 306 determines that it is impossible to read a script from a source other than the package.

If it is determined in the step S1201 that it is impossible to read a script from a source other than the package, the VM system service 306 executes a step S1207, et seq., described hereinafter. On the other hand, if it is determined in the step S1201 that it is possible to read a script from a source other than the package, the VM system service 306 attempts to retrieve the native code script of the designated extension application from the aforementioned file system (step S1202). Then, the VM system service 306 determines whether or not the corresponding script is retrieved (step S1203).

If it is determined in the step S1203 that the corresponding script is not retrieved, the VM system service 306 determines whether or not the type of access to the script is load access (step S1204). In the present embodiment, the type of access is either load access or text data access.

If it is determined in the step S1204 that the type of access to the script is load access, the VM system service 306 attempts to retrieve a bytecoded script of the designated extension application from the file system (step S1205). Then, the VM system service 306 determines whether or not the corresponding script is retrieved (step S1206).

If it is determined in the step S1206 that the corresponding script is not retrieved, the VM system service 306 determines whether or not the type of access to the script is load access (step S1207).

If it is determined in the step S1207 that the type of access to the script is load access, the VM system service 306 attempts to retrieve the bytecoded script of the designated extension application from the package (step S1208). Then, the VM system service 306 determines whether or not the corresponding script is retrieved (step S1209).

If it is determined in the step S1209 that the corresponding script is not retrieved, the VM system service 306 retrieves a native code script of the designated extension application from the package (step S1210). That is, in the present embodiment, when retrieving a script for starting the extension application from the package, a bytecoded script is more preferentially retrieved than a native code script. After that, the VM system service 306 terminates the present process.

If it is determined in the step S1204 that the type of access to the script is not load access, i.e. if the type of access is text data access, the VM system service 306 proceeds to the step S1207, and then further proceeds to the step S1210. In the present embodiment, for example, when acquiring a native code script as the debug information according to the debug information acquisition request from the PC 102, the text data access is performed.

If it is determined in the steps S1203, S1206, and S1209 that the corresponding script is retrieved, the VM system service 306 terminates the present process.

According to the above-described process in FIG. 12, when retrieving a script for starting an extension application from the package, a bytecoded script is more preferentially retrieved than a native code script. With this, when an instruction for starting the extension application is received, it is possible to quickly start the extension application corresponding to the start instruction without bytecoding the script while preventing compatibility with the extension application from being impaired.

Figure 13:
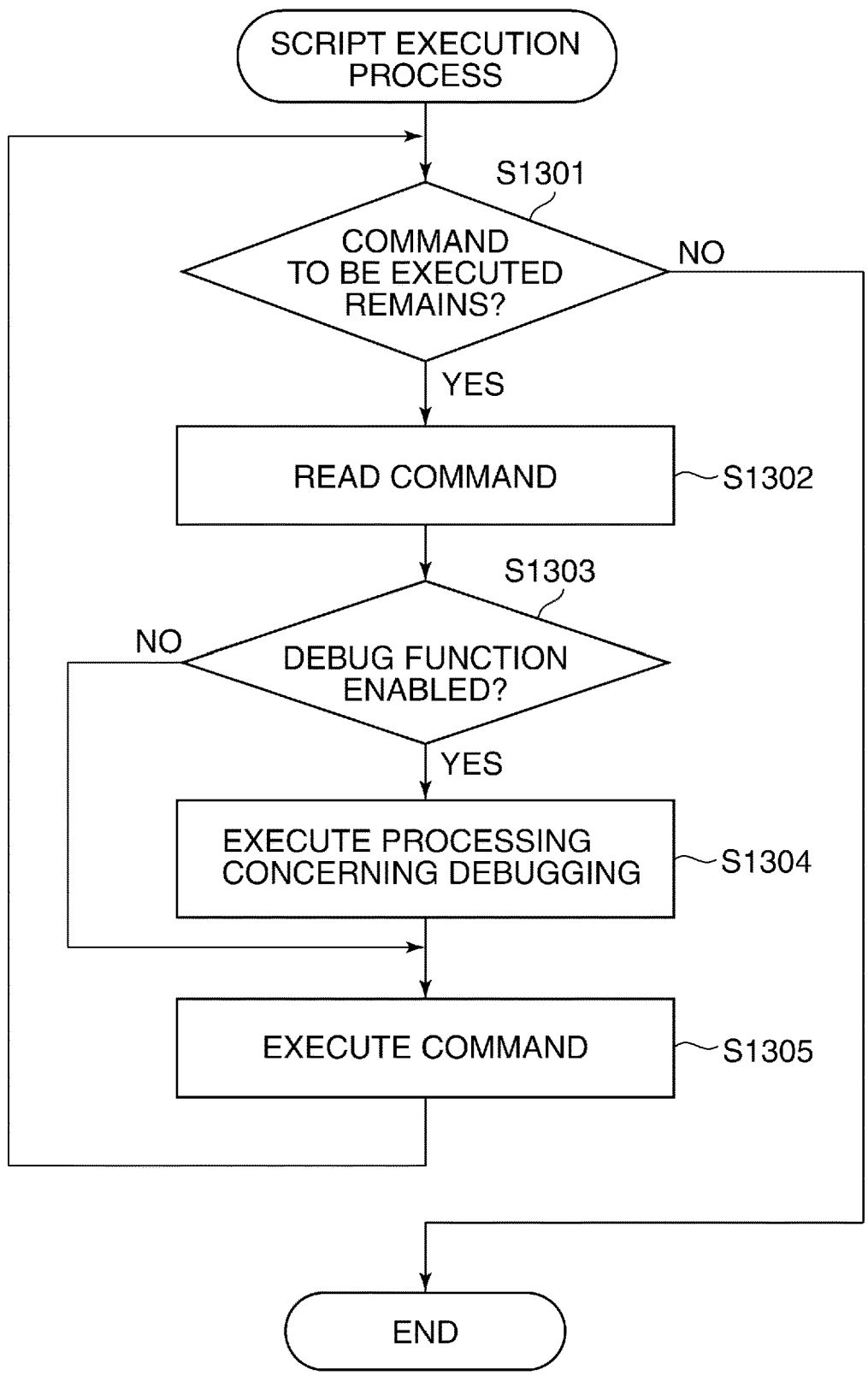
FIG. 13 is a flowchart of a script execution process performed by a VM appearing in FIG. 3.

FIG. 13 is a flowchart of a script execution process performed by the VM 303.

The script execution process in FIG. 13 is performed when the bytecoded script is loaded into the VM 303 by executing the processing in the S1105 in FIG. 11.

Referring to FIG. 13, the VM 303 sequentially analyzes the contents of the loaded bytecoded script from the first row, and determines whether or not there remains a command to be executed (step S1301).

If it is determined in the step S1301 that there remains a command to be executed, the VM 303 reads the remaining command (step S1302), and determines whether or not the debug function is enabled (step S1303).

If it is determined in the step S1303 that the debug function is enabled, the VM 303 performs the processing operations concerning debugging, such as processing for temporarily stopping the extension application in the step S919 in FIG. 9, and processing for restarting execution of the extension application in the step S923 in FIG. 9 (step S1304). Then, the VM 303 executes the command read in the step S1302 (step S1305), and returns to the step S1301.

If it is determined in the step S1303 that the debug function is disabled, the VM 303 proceeds to the step S1305.

If it is determined in the step S1301 that there remains no command to be executed, the VM 303 terminates the present process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108036 filed May 31, 2017, which is hereby incorporated by reference herein in its entirety.

What is claimed is:

1. An image forming apparatus that installs an operation program of an extension application therein, and includes a Virtual Machine (VM) that executes a bytecoded program generated by converting the operation program to bytecode, comprising:
   a generation unit configured to generate the bytecoded program to be executed by the VM included in the image forming apparatus by converting the operation program of the extension application to bytecode;
   a writing unit configured to write the operation program of the extension application and the bytecoded program, which is generated by converting the operation program of the extension application to bytecode and which is to be executed by the VM included in the image forming apparatus, into a package such that the package includes the operation program of the extension application and the bytecoded program, which is generated by converting the operation program of the extension application to bytecode and which is to be executed by the VM included in the image forming apparatus; and
   a storage unit configured to store the package including the operation program of the extension application and the bytecoded program, which is generated by converting the operation program of the extension application to bytecode and which is to be executed by the VM included in the image forming apparatus.

2. The image forming apparatus according to claim 1, further comprising a determination unit configured to determine whether or not the bytecode of the generated bytecoded program is bytecode of a version which can be executed by the VM, and
   wherein in a case where the bytecode of the generated bytecoded program is not bytecode of a version which can be executed by the VM, the generation unit generates a new bytecoded program by converting the operation program written into the package to bytecode of a version which can be executed by the VM.

3. The image forming apparatus according to claim 2, wherein the operation program is formed by a plurality of operation programs,
   wherein the generation unit converts the plurality of operation programs to bytecode to thereby generate a plurality of bytecoded programs, respectively, and
   wherein the determination unit determines, with respect to part of the plurality of bytecoded programs, whether or not the bytecode is bytecode of a version which can be executed by the VM.

4. The image forming apparatus according to claim 3, wherein the part of the bytecoded programs is one of the plurality of bytecoded programs, which is to be executed first so as to start the extension application.

5. The image forming apparatus according to claim 2, wherein the writing unit writes the operation programs and the new bytecoded programs into a new package, and
   wherein the storage unit stores the new package.

6. The image forming apparatus according to claim 5, wherein the package is deleted when the new package is stored.

7. The image forming apparatus according to claim 1, further comprising a retrieval unit configured to retrieve a program from the package, and
   wherein when starting the extension application, the retrieval unit preferentially retrieves the generated bytecoded program from the package.

8. A method of controlling an image forming apparatus that installs an operation program of an extension application therein, and includes a Virtual Machine (VM) that executes a bytecoded program generated by converting the operation program to bytecode, the method comprising:
   generating the bytecoded program to be executed by the VM included in the image forming apparatus by converting the operation program of the extension application to bytecode;
   writing the operation program of the extension application and the bytecoded program, which is generated by converting the operation program of the extension application to bytecode and which is to be executed by the VM included in the image forming apparatus, into a package such that the package includes the operation program of the extension application and the bytecoded program, which is generated by converting the operation program of the extension application to bytecode and which is to be executed by the VM included in the image forming apparatus; and storing the package including the operation program of the extension application and the bytecoded program, which is generated by converting the operation program of the extension application to bytecode and which is to be executed by the VM included in the image forming apparatus.

9. A non-transitory computer-readable storage medium storing a computer-executable program for executing a method of controlling an image forming apparatus that installs an operation program of an extension application therein, and includes a Virtual Machine (VM) that executes a bytecoded program generated by converting the operation program to bytecode, wherein the method comprises:

generating the bytecoded program to be executed by the VM included in the image forming apparatus by converting the operation program of the extension application to bytecode;

writing the operation program of the extension application and the bytecoded program, which is generated by converting the operation program of the extension application to bytecode and which is to be executed by the VM included in the image forming apparatus, into a package such that the package includes the operation program of the extension application and the bytecoded program, which is generated by converting the operation program of the extension application to bytecode and which is to be executed by the VM included in the image forming apparatus; and storing the package including the operation program of the extension application and the bytecoded program, which is generated by converting the operation program of the extension application to bytecode and which is to be executed by the VM included in the image forming apparatus.

\* \* \* \* \*